United States Patent [19]

Katagiri et al.

[11] Patent Number: 4,460,067
[45] Date of Patent: Jul. 17, 1984

[54] PAD-WEAR-LIMIT WARNING DEVICE FOR DISC BRAKE

[75] Inventors: Masayoshi Katagiri, Toyota; Toshio Kondo, Okazaki, both of Japan

[73] Assignees: Toyota Jidosha Kogyo Kabushiki Kaisha; Aisin Seiki Kabushiki Kaisha, both of Aichi, Japan

[21] Appl. No.: 343,476

[22] Filed: Jan. 28, 1982

[30] Foreign Application Priority Data

| Feb. 20, 1981 | [JP] | Japan | 56-24484 |
| May 30, 1981 | [JP] | Japan | 56-82708 |
| May 30, 1981 | [JP] | Japan | 56-82709 |

[51] Int. Cl.³ .................................... F16D 66/02
[52] U.S. Cl. ........................................ 188/1.11
[58] Field of Search .............. 116/203, 208; 188/1.11

[56] References Cited

U.S. PATENT DOCUMENTS

| 3,141,524 | 7/1964 | Mishler | 188/1.11 |
| 4,037,689 | 7/1977 | Maehara | 188/1.11 |
| 4,085,827 | 4/1978 | Kestermeier | 188/1.11 |

FOREIGN PATENT DOCUMENTS 1509871 5/1978 United Kingdom .
1567103 5/1980 United Kingdom .

Primary Examiner—Duane A. Reger
Attorney, Agent, or Firm—Parkhurst & Oliff

[57] ABSTRACT

A device for warning the allowable wear-limit of a pad assembly in a disc brake. The device comprises (a) a vibration member composed of (i) a fixing portion secured to a lateral end portion of a backing plate of the pad assembly, (ii) a spring portion bent into a curve as an extension from the fixing portion for being located on the rear side of the pad assembly, and (iii) a vibrating portion extended from the spring portion, passing through between the lateral end portion of the backing plate and a torque member movably supporting the same, toward the friction surface of the disc rotor as far as almost reach at a tip thereof a wear limit of the pad assembly, (b) a supporting member supporting the vibrating portion at a root portion thereof against biasing force of the spring portion, and (c) a projection disposed on either the supporting member and the vibration portion for determining contact position therebetween. The vibrating portion produces the alarming sound according to natural frequency thereof which is determined by the length from the projection up to the tip of the vibrating portion.

16 Claims, 19 Drawing Figures

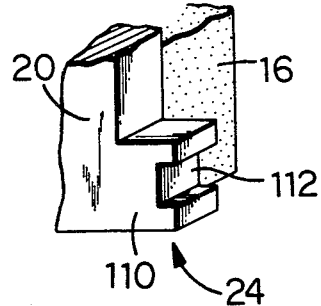
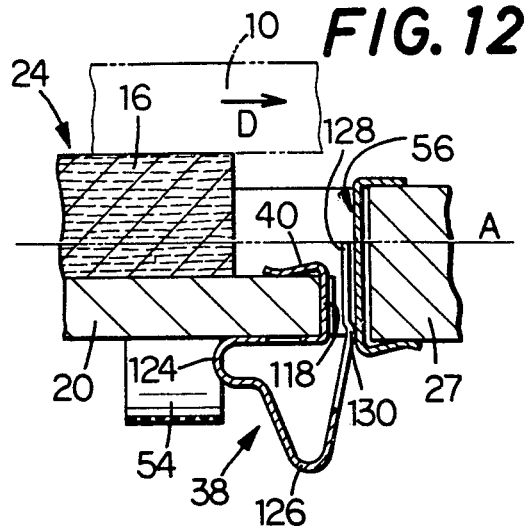
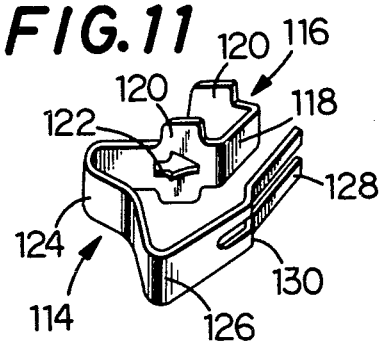
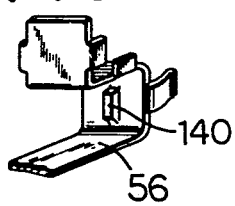
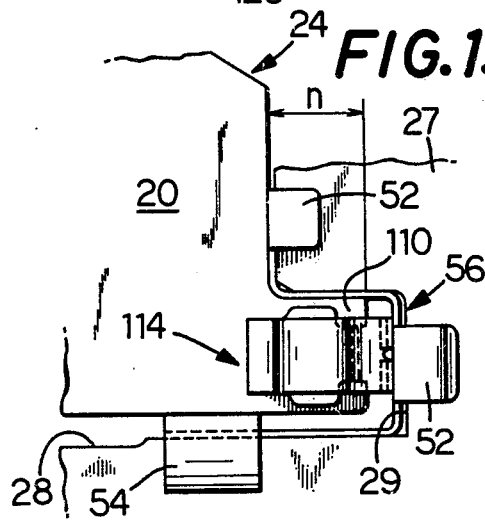
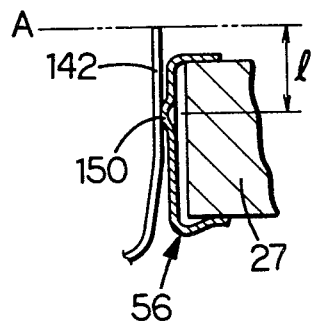
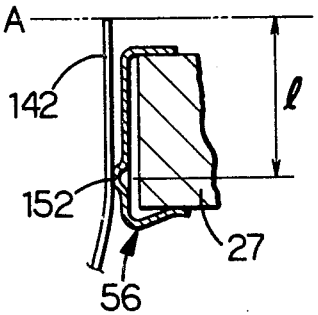

PAD-WEAR-LIMIT WARNING DEVICE FOR DISC BRAKE

BACKGROUND OF THE INVENTION

This invention relates to a wear-limit warning device for giving a driver an alarm when a pad assembly in a disc brake has been worn to such an allowable maximum limit as to need replacement.

A pad assembly, provided with a friction pad oppositely disposed to a friction surface of a disc rotor and a backing plate firmly attached to the backside thereof, is retained by a torque member for being urged, when the brake is applied, by an urging member disposed on the outer side of the pad assembly, onto the disc rotor in rotation so as to restrain the rotation thereof. The friction pad of the pad assembly is gradually worn according to the repeated brake application so as to finally require its replacement by reaching an allowable maximum wear limit.

As the wear-limit warning device for warning a driver of the reaching of the allowable wear-limit, there is known a warning device for generating a peculiar sound, when the friction pad has been worn to the allowable maximum limit, by making a contact member attached to the pad assembly slidingly contact the disc rotor in rotation. This device has been, however, unsatisfactory so far due to its too small sound volume or too similar sound tone with other vibration sounds, which makes the distinction from other sounds difficult. Enlarging the alarm sound inevitably requires to make stronger the urging of the contact member onto the disc rotor, which in turn scratches the disc rotor to an impracticable extent.

SUMMARY OF THE INVENTION

This invention was made, with such a background, from a series of experiments for the purpose of providing a novel wear-limit warning device for giving a driver a noticeable alarm when the pad assembly has been worn to the maximum allowable limit requiring replacement. In other words, this invention was based on the findings from the series of experiments as hereinunder described. A vibrating member which is supposed to contact with the disc rotor will produce an extremely high sound, an unprecedented easily audible high frequency sound, if it is extended passing through between the backing plate of the pad assembly and the torque member and besides positioned in a contacted status with either one of the backing plate or the torque member, through vibration caused by a sliding contact with the disc rotor.

The object of this invention is, therefore, the provision of a device for giving a noticeable alarming sound, which is used for a pad assembly consisting of a friction pad and a backing plate secured to the backside thereof and being retained by a torque member for being urged onto the friction surface of the disc rotor, when the friction pad has been worn to the maximum allowable limit.

Another object of this invention is to provide a pad-wear-limit warning device having such a simple structure as to make it possible to achieve the above-mentioned object at an extremely inexpensive manufacturing cost.

Still another object of this invention is to provide a pad-wear-limit warning device which is easy to assemble and also well prevented from dislocation, or coming off, of a vibrating member from a predetermined right position.

According to the present invention there is provided a device for warning the allowable wear-limit of a pad assembly in a disc brake, in which said pad assembly provided with a friction pad and a backing plate firmly attached to the backside thereof is retained by a torque member for being urged onto a friction surface of a disc rotor so as to restrain rotation of said disc rotor, by producing an alarming sound when said friction pad has been worn to a maximum allowable limit, said device comprising (a) a vibration member composed of (i) a fixing portion secured to a lateral end portion of said backing plate, (ii) a spring portion bent into a curve as an extension from said fixing portion for being located on the rear side of said pad assembly, and (iii) a vibrating portion extended from said spring portion, passing through between the lateral end portion of said backing plate and said torque member, toward the friction surface of said disc rotor as far as almost reach at a tip thereof a wear limit of said pad assembly; (b) a supporting member supporting said vibrating portion at a root portion thereof against biasing force of said spring portion; and (c) a projection disposed on one of said supporting member and vibration portion for determining contact position therebetween, whereby when the tip of said vibrating portion is contacted with said disc rotor said vibrating portion produces the alarming sound according to natural frequency thereof which is determined by the length from said projection up to the tip of said vibrating portion.

The device is inexpensive and simple in structure and capable of warning the allowable wear-limit of the pad assembly without a major change to conventional disc brake system. The device is very effective for the purpose of surely alarming the driver of the wear-limit of and consequently necessity of replacing the pad assembly by a special sound of high frequency tone.

BRIEF DESCRIPTION OF THE DRAWING

FIG. 10 is a perspective view of the environment of a lug in another embodiment of this invention;

FIG. 11 is a perspective view of a vibration spring to be attached to the lug shown in FIG. 10;

FIGS. 12 and 13 are respectively a sectional plan view and a rear view of an essential part in the embodiment employing the lug shown in FIG. 10 and the spring shown in FIG. 11;

FIG. 16 is a perspective view of an anti-rattling spring used in the embodiment shown in FIGS. 14 and 15;

FIGS. 17 and 18 are respectively a plan sectional view of an essential part of another embodiment of this invention.

DETAILED DESCRIPTION OF THE PREFERRED EMBODIMENT

The invention will be described further in detail based on preferred embodiments which are illustrated in the appended drawings.

Figure 1:
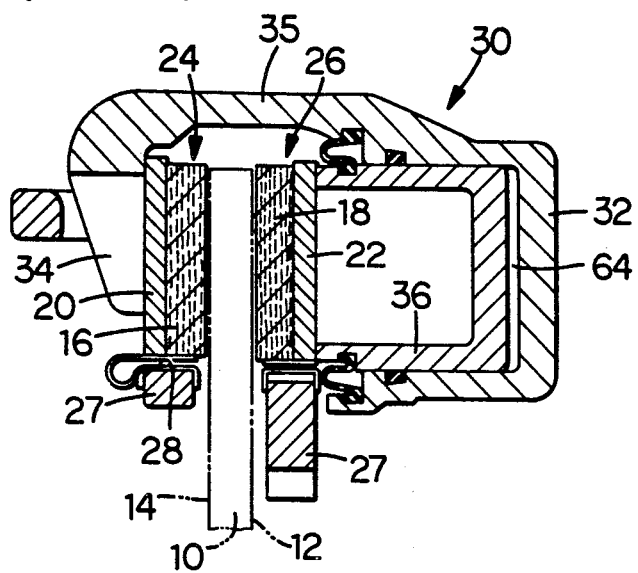
FIGS. 1 and 2 are respectively a side sectional view and an elevational sectional view of a disc brake in which an embodiment of a pad-wear-limit warning device of this invention is applied.
Figure 2:
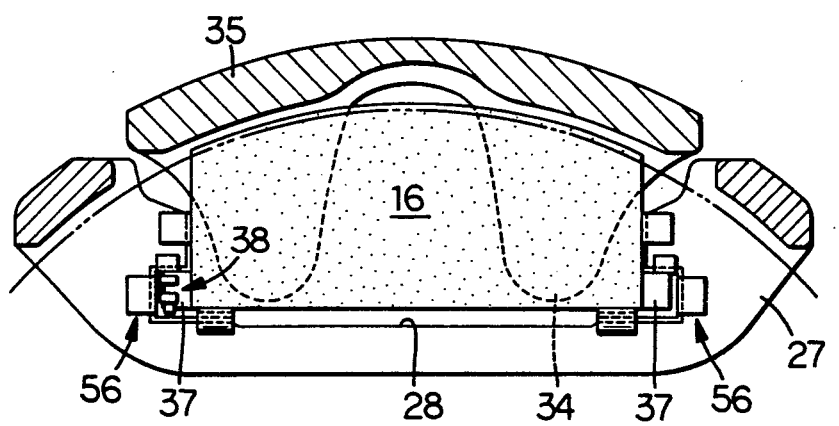

Numeral 10 in FIGS. 1 and 2 designates a disc rotor having a pair of friction surfaces 12, 14 on opposite sides thereof and being rotatable with a vehicle wheel. On both sides of the disc rotor 10 an outer pad 24 and an inner pad 26 are respectively arranged, each being composed of a friction pad 16(18) and a backing plate 20(22) stuck on the backside of the former. Each of those pads 24(26) is removably fitted into a notch 28 formed in the central portion of a torque member 27 for being shiftably retained in a perpendicular direction to the friction surface 14(12) of the disc rotor 10. Friction force applied on the pad 24(26) at a brake application time can therefore be received by the torque member 27. Incidentally, the torque member 27 is secured on a not-shown axle housing and provided with a pair of mutually faced plate portions which are connected in a straddling manner over the periphery of the disc rotor 10 so as to retain the pads 24, 26 and a later described caliper 30.

The caliper 30 provided with a cylinder portion 32 opposed to the inner pad 26, a reaction portion 34 opposed to the outer pad 24, and a bridge portion 35 for bridging the cylinder portion 32 and the reaction portion 34 is so mounted as to straddle the pair of pads 24, 26. In the cylinder portion 32 a piston 36 is slidably fitted and the reaction portion 34 is bifurcated along the backside of the backing plate 20. And the caliper 30 is movably retained in a parallel direction to the axis of the disc rotor 10 by mutual fitting between a fitting hole formed each on the tip of a not-shown arm extending in opposite directions from either side of the caliper 30 and a not-shown slide pin formed each as a projection on the torque member 27 in a parallel direction to the axis of the disc rotor 10.

The backing plate 20 of the outer pad 24 is provided with, at both lateral end portions thereof, a pair of lugs 37, 37 projecting from a nearer portion of each of the lateral portions in a circumferential direction of the rotor 10 to be slidably engaged with guide grooves 29 formed in the torque member 27. On one of the lugs 37 a spring 38 as a vibration member is fixed. Besides, the inner pad 26 is similarly constructed as the outer pad 24 notwithstanding ommission of illustration.

Figure 3:
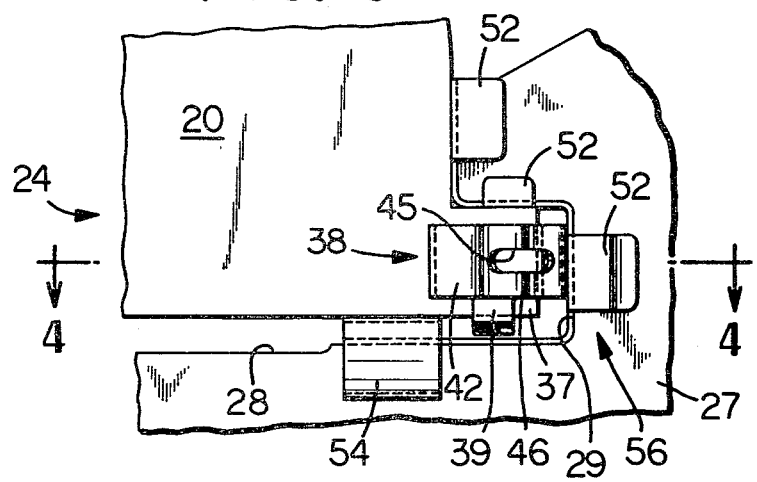
FIG. 3 is a partially enlarged view for showing an essential part of the embodiment in FIG. 2 at the backside thereof.
Figure 4:
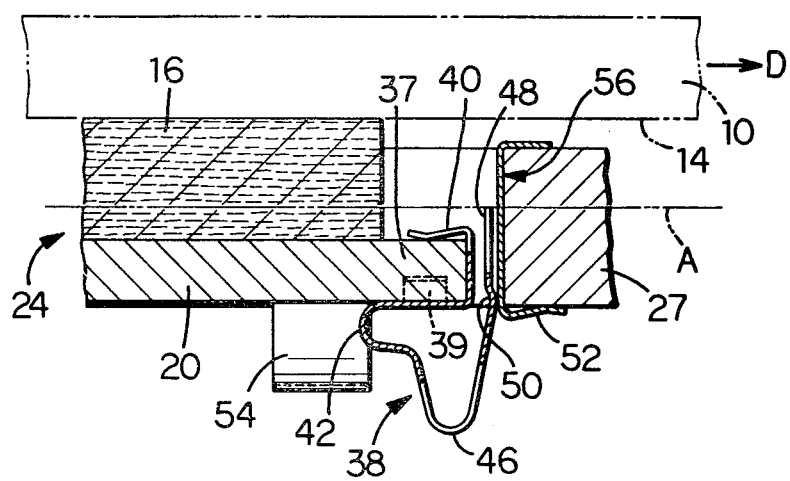
FIG. 4 is a sectional view taken along the section line 4—4 in FIG. 3.

The vibration spring 38 made of a piece of strip consists of following five portions as can be seen in FIGS. 3 and 4: a fixing portion 40 of substantially leftwards-tilted angular U-shape, bent in the longitudinal direction of the strip so as to embrace one of the lugs 37, and provided with a positioning stopper 39 against vertical movement; a spring portion including a first bent portion 42 of rightwardly-tilted U-shape consecutively extending from the fixing portion 40, being bent outside the backing plate 20 and a second bent portion 46 extended almost perpendicularly from the first bent portion 42 in a departing direction from the disc rotor 10 before being reversely turned so as to form a U-shape again, and provided with an elongated hole 45 formed longitudinally in the center area thereof; a vibrating portion 48 extended from the reversely turned side of the second bent portion 46, passing through a gap between the lug 37 and the torque member 27 toward the disc rotor 10 so as to reach at the tip thereof a maximum wear-limit A of the friction pad 16, and vibratile in the circumferential direction of the disc rotor 10; and a projection 50 protruded, from the vibrating portion 48 (exactly between the vibrating portion 48 and the second bent portion 46) and within the gap between the end of the lug 37 and the torque member 27, toward the torque member 27. The vibrating portion 48 is bifurcated from a portion thereof near the projection 50. The aforementioned first bent portion 42 of U-shape opened in a direction perpendicular to the longitudinal direction of the vibrating portion and the second bent portion 46 of U-shape opened in a direction parallel to the longitudinal direction of the vibrating portion function in the gap between the lug 37 and torque member 27 well as retain the vibrating portion 48 while allowing the same to somewhat retreat when it is forced by the disc rotor 10 to do so, that is to say, the both bent portions form a spring portion. The biased projection 50 defines the sole contact area between the vibrating portion 48 and an adjacent surface (supporting member) formed by torque member 27 or the spring 56 attached thereto to space the vibrating portion 48 from the adjacent torque member 27 and spring 56 within the previously noted gap. Additionally, the stopper 39 for positioning the vibration spring 38 in the vertical direction is downwardly bent at the tip thereof such that when the fixing portion 40 is lowered by chance due to slackening thereof it can be prevented from further falling by the abutment onto the inside surface of the notch 28.

On the other hand, a pair of anti-rattling springs 56, each having bracing portions 52 embracing the torque member 27 and a spring portion 54 for pushing upwards the pads 24, 26 for preventing rattling of them, are respectively disposed on the inner side of the notch 28 opposed to the lug 37. The projection 50 of the vibration spring 38 is therefore indirectly abutted via the anti-rattling spring 56 onto the torque member 27. Thus, the spring 56 serves as a supporting member which supports the vibrating portion 48 at the projection 50 which is located at a root portion of the vibrating portion 48. Further, as can be seen in FIG. 3, the previously indicated gap between the lug 37 and the torque member 27, in which the vibrating portion and spring portion of the vibrating spring are located, is maintained even upon brake application because the torque member 27, in this instance, contacts the pad 24 (26) through the portion 52 of the anti-rattling spring 56 opposite the end surface of the backing plate 20, as shown in FIG. 3 (also shown in FIGS. 13 and 14). FIGS. 3 and 4 illustrate the neighborhood of only one lug 37 of the outer pad 24 because of similar arrangement in the neighborhood of the other lug 37, except only non-disposing of the vibration spring 38.

As mentioned above the vibration spring 38 can be an effective wear-limit alarming device, irrespective of its being extremely simple in structure, which further allows to be mounted with little alteration in conventional disc brake systems.

Operation of the device will be described hereunder.

Braking fluid supplied to an oil chamber 64 of the cylinder portion 32, when the brake is applied, will push out the piston 36, the inner pad 26 being in turn urged onto the friction surface 14 of the disc rotor 10. A reaction caused by this will move the cylinder portion 32 in a counter direction to the movement of the piston 36. The reaction portion 34 which is accompanied by the movement of the cylinder portion 32 consequently urges the outer pad 24 onto the other friction surface 12 of the disc rotor 10 for eventually restraining the rotation of the disc rotor 10.

Due to repeated braking operation the friction pads 16, 18 of the outer pad 24 and the inner pad 26 are gradually worn at the contacting surfaces with the disc rotor 10 so as to reach an allowable limit of the wearing at last. When the wear of the friction pad 16 reaches the allowable limit the tip of the vibrating portion 48 of the vibration spring 38 begins to touch the disc rotor 10 which is in rotation in a direction indicated with an arrow D in FIG. 4, when the vibrating portion 48 is vibrated by a so-called stick slip phenomenon to produce a large sound of chiefly high frequency tone. This sound is far higher in frequency than ordinary noises occurring in a vehicle, so it can be a very effective alarm or warning to the driver telling the maximum allowable limit of the wear in the pads 24, 26. Furthermore, the vibrating portion 48 is unlikely to give a scratch or scratches on the surface of the disc rotor 10 with which it is supposed to cause the stick slipping, because it is so retained by the first bent portion 42 and the second bent portion 46 as to soften the contact between the two members.

Figure 5:
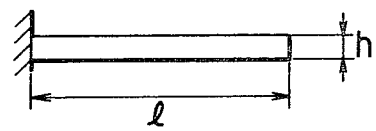
FIGS. 5 and 6 are a side view and a cross-sectional view of a cantilever for explaining the function of a vibrating portion of a vibration spring.
Figure 6:
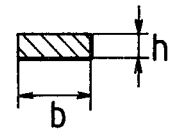

The high frequency sound generated by the vibrating portion 48 can be explained theoretically as follows. The vibration of the vibrating portion 48 is thought to a natural vibration of a cantilever. Assume here the length, thickness, width, and mass of this cantilever to be respectively l, h, b, and m as shown in FIGS. 5 and 6, the equation $$\frac{d^2x}{dt^2} + w^2x = 0 \tag{1}$$

is established as well known, wherein x designate the movement amount of the cantilever at the tip thereof. Solution of the equation (1) will be given as:

$$x = A \sin(wt + \epsilon) \tag{2}$$

wherein the angular speed w is well known as:

$$w = \sqrt{k/m} \tag{3}$$

and a constant k can be indicated according to a general formula in dynamics as:

$$k = \frac{3EJ}{l^3} \tag{4}$$

and a constant J can be indicated as:

$$J = \frac{bh^3}{12} \tag{5}$$

As the natural frequency f, on the other hand, is indicated as:

$$f = \frac{w}{2\pi} \tag{6}$$

From the equations (3) to (6) effective conditions for getting a sound of high frequency tone can be derived as (a) the length l of the cantilever should be reduced, and (b) the width b or thickness h thereof should be increased.

Examination of the vibrating portion 48 by applying the above-mentioned necessary conditions reveals that the natural vibration of the vibrating portion 48 excited by the sliding contact with the disc rotor 10 can be regarded as a natural vibration taking place on a cantilever of extremely short length ranging from the projection 50 where the vibrating portion 48 contacts the anti-rattling spring 56 up to the very tip thereof. This justifies the production of a high frequency sound because of satisfying the condition (a) by the vibrating portion 48. Merely satisfying the condition (b) by increasing or enlarging the width and/or thickness of the vibrating portion 48, without forming the projection 50, is irrecommendable in this case, because it will inevitably increase the strength of the vibrating portion 48 with a result of possible scratching thereby of the disc rotor surface.

Another embodiment of this invention will be described hereunder. Difference from the first embodiment lies only in the structure of the vibration spring 38, superfluous explanation on other parts being omitted.

A vibration spring 68 is provided, just like the fixing portion 40, the first bent portion 42, the second bent portion 46, and the vibrating portion 48 in the previous vibration spring 38, with a fixing portion 70, a first bent portion 72, a second bent portion 74, and a vibrating portion 76 of similar shape for being secured on the lug 37. And a projection 78, although similarly located as the projection 50 in the previous embodiment, is projected in a reversed direction, viz., toward the lug 37, and both bent portions (72, 74) bias the vibrating portion 76 in a direction in which the projection 78 nears the backing plate 20. The projection is therefore indirectly abutted onto the backing plate 20 via the fixing portion 70. Thus, the fixing portion 70 serves as a supporting member for the vibrating portion 76. Incidentally, rotating direction of the disc rotor is indicated with a sign E in FIG. 7.

This embodiment is advantageous in easy mounting of the vibration spring 68, when it is put in place in the notch 28 of the torque member 27, in already fixed status to the backing plate 20, because the vibrating portion 76 thereof is not being outwardly expanded at the time of putting-in.

Figure 7:
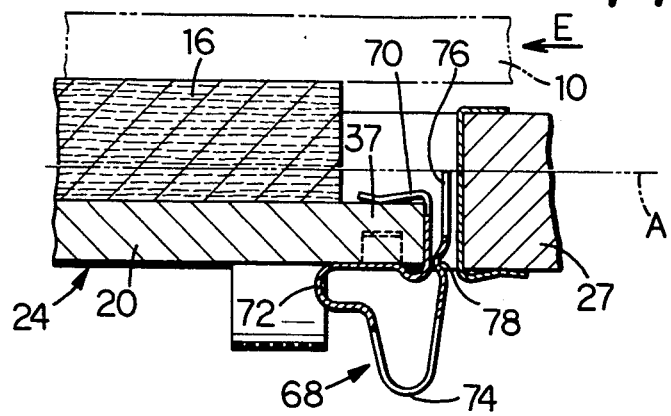
FIGS. 7–9 are respectively a corresponding view to FIG. 4 of different embodiments of this invention.
Figure 8:
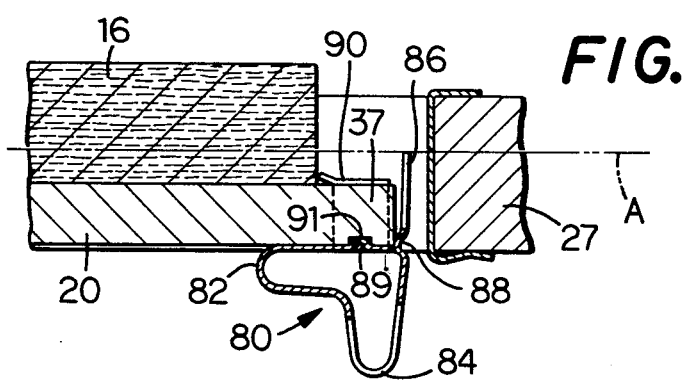

In still another embodiment shown in FIG. 8 a vibration spring 80 is provided with a first bent portion 82, a second bent portion 84, a vibrating portion 86, and a projection 88 respectively similar to the first bent portion 72, the second bent portion 74, the vibrating portion 76, and the projection 78 in the embodiment of the spring 68 shown in FIG. 7. Only a fixing portion 90 is dissimilar which is formed into a U-shape so as to embrace the lug 37 from the lower side, by being bent along a plane perpendicular to a plane along which the first and second bent portions 82 and 84 are bent. The end portion of the lug 37 is therefore not covered by the fixing portion 90, but directly abutted by the projection 88 and thus directly serving as a supporting member for the vibrating portion 86. On the fixing portion 90 a small projection 91 is formed for being engaged with a small recess 89 so as to prevent the spring 80 from moving. In this embodiment the stopper 39 in the embodiment shown in FIG. 3 can be eliminated with a meritorious result of simplifying the shape of the fixing portion 90.

Figure 9:
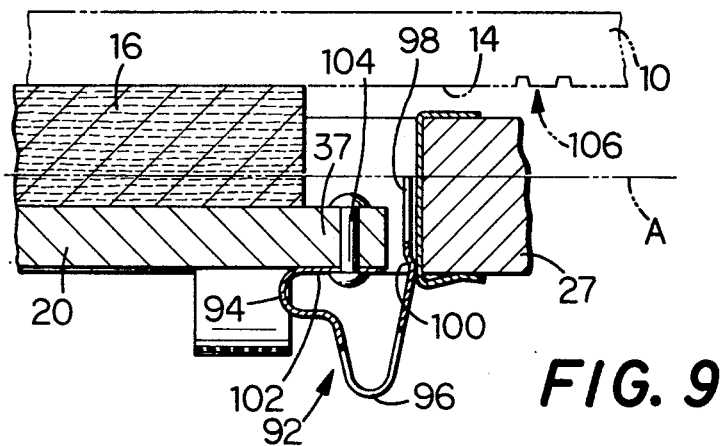

In another embodiment shown in FIG. 9 a vibration spring 92 is provided with a first bent portion 94, a second bent portion 96, a vibrating portion 98, and a projection 100 respectively similar to the first bent portion 42, the second bent portion 46, the vibrating portion 48, and the projection 50 in the embodiment of the spring 38 shown in FIG. 4. Only the difference of the spring 92 from the spring 38 resides in that a fixing portion 102 of flat plate shape is secured to the lug 37 with a rivet 104 on the external back side thereof.

Incidentally, on the surface of the disc rotor 10 an uneven portion or rugged portion 106 may be formed as shown in FIG. 9 where the contacted vibrating portion 98 is positively excited, although contact of the vibrating portion 98 with a flat friction surface 14 is of course permissible. In this instance the alarming sound produced by the vibrating portion 98 is expected to be larger, being an additional merit.

Another embodiment is shown in FIGS. 10-13. In this embodiment an attaching groove 112 is formed, as shown in FIG. 10, on an end surface of a lug 110 on the backing plate 20 of the outer pad 24. The attaching groove 112 is formed along the direction of thickness of the backing plate 20 with a rectangular cross section. And a vibration spring 114 is formed into a shape shown in FIG. 11. A fixing portion 116 of it consists of a fitting portion 118 in the middle and a pair of broad-width portions 120, 120 extending from either end of the fitting portion 118. The fitting portion 118 is fitted into the attaching groove 112 and the broad-width portions 120 sandwich the lug 110 from both sides, front and rear, so as to firmly fix the vibration spring 114 to the lug 110. In the middle area of the broad-width portion 120 on the rear side, that is remoter side from the rotor 10, an arrow mark 122 is cut by punching for indicating the rotational direction of the rotor 10 to prevent wrong attaching of the vibration spring 114 to the outer pad 24. The vibration spring 114 is provided with a first bent portion 124, a second bent portion 126, a pair of vibrating portions 128 and a pair of projections 130, 130. That is to say, the vibration spring 114 is bifurcated from an arm of the second bent portion 126 to the tips of the vibrating portions 128 through the projections 130. The vibration spring 114 is mounted similarly in the previous embodiment as shown in FIGS. 12 and 13.

In this embodiment the vibration spring 114 having the fitting portion 118, which is of the same width as the groove 112 formed in the lug 110 of the backing plate 20, is fitted thereinto. This way of fitting allows, in comparison with the embodiment shown in FIGS. 3 and 4, the distance of the end surface of the lug 110 from the bottom surface of the guide groove 29 in the torque member 27 to be smaller by an amount corresponding to the depth of the attaching groove 112.

The retraction of the end surface of the lug 110 signifies retrenchment of length, n in FIG. 13, of the projection thereof that much, which results in precipitating wear of the contact portion of the lug 110 with torque member 27. The friction force acting between, when braking is applied, the pad 24 and the rotor 10 strongly urges the end surface of the pad 24 on the trailing side onto the torque member 27 as well as rotates the pad 24 toward the external periphery of the rotor 10 by assuming its center at a supported portion of itself by the torque member 27. As this rotational movement of the pad 24 is restrained by contact of the upper surface of the lug 110 (remoter side from the center of the rotor 10) with the lower surface of the guide groove 29, the upper surface of the lug 110 and the corresponding surface of the guide groove 29 are urged to each other strongly when braking applied. As the both are furthermore moved relatively to each other in that contact state due to vibration of the brake system, the contact surface of either member is liable to be worn. The contact surfaces of the both are moreover constantly urged to each other, even when braking is not applied, due to the resilient force of the anti-rattling spring 56 for being repeatedly slided or impacted mutually. The contact surfaces of the lug 110 and the guide groove 29 are exposed to wear from this reason, too, so the retrenchment of the length of projection of the lug 110 will precipitate the wear through the necessary reduction of the contact surface.

Instead of retrenching the projection length of the lug 110 increasing the depth of the guide groove 29 by that much can be thought for avoiding the disadvantage, but it also brings about some different demerits such as reducing rigidity of the torque member 27 and increasing difficulty of machining of the guide groove 29, which eventually leads to cost-up and productivity-down for the device.

In the earlier disclosed device the vibration spring 38 can be mounted or loaded in place only by putting the fitting portion 118 into the attaching groove 112 by meritoriously avoiding not only retrenchment of the lug 110 but also increasing of the depth of the guide groove 29.

As the fitting portion 118 of the vibration spring 114 possesses the same width with that of the attaching groove 112, it can be firmly fitted to the bottom of the groove 112 along the whole width thereof, and it is further secured therewith the aid of the broad-width portions 120, 120 which stably pinch the lug 110. It ensures no occurrence of positional deviation of the spring 114 even when the vibrating portions 128 are in operation, eliminating disposition of a stopper for preventing the positional deviation. The spring 114 can be simple in structure in this way for reducing the manufacturing cost.

Figure 14:
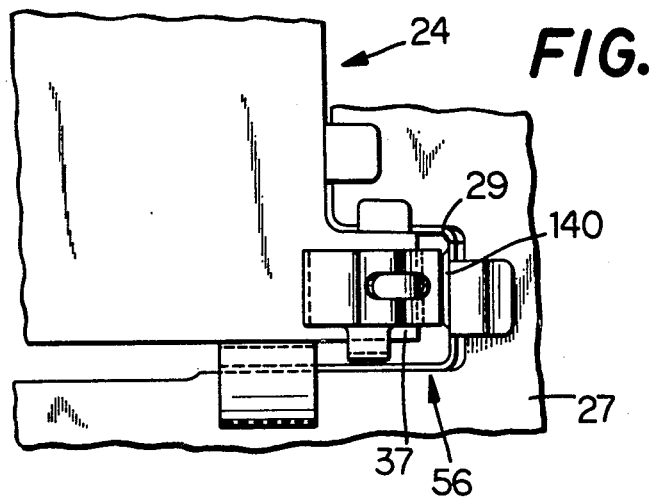
FIGS. 14 and 15 are respectively a rear view and a plan sectional view of another embodiment of this invention.
Figure 15:
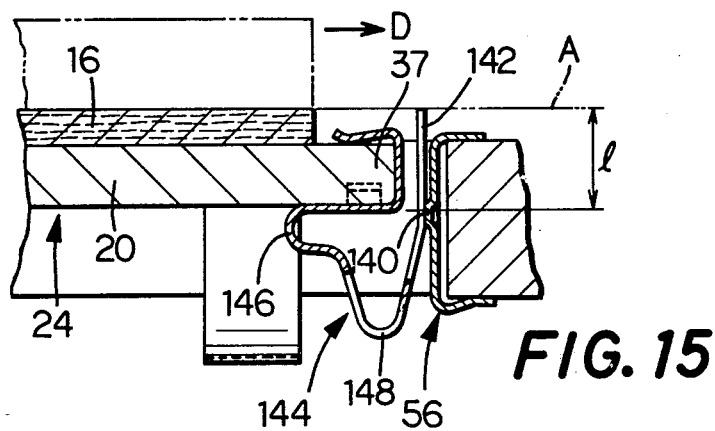

Another embodiment is shown in FIGS. 14-16. In this embodiment, a projection 140 for determining contact position between a vibrating portion 142 of a vibration spring 144 and an anti-rattling spring 56 as a supporting member is formed on the anti-rattling spring 56. The anti-rattling spring 56 is supporting the vibrating portion 142 at the projection 140 against biasing force of a spring portion which consists of a first bent portion 146 and a second bent portion 148. The length of the vibrating portion 142 of this embodiment can be selected comparatively long. Describing more detail, it is also permissible to dispose a projection 50 on the side of the vibrating portion as shown in FIG. 4, but in this instance the length l is at most limited to the length between the maximum wear-limit A and the rear side (farther side from the rotor 10) edge of the anti-rattling spring 56. It is adjustable only within this range. Because the projection 50 must be positioned to be contacted with the internal surface of the anti-rattling spring 56 when the pad 24 is located at the initial most retreated position, i.e., at the remotest position from the rotor 10 as shown in FIG. 4, lest it should be resistive to the movement of the pad 24 due to engaging the anti-rattling spring 56 at the rear edge thereof, since the projection 50 moves in unison with the pad 24. Therefore the length from the projection 50 to the tip of the vibrating portion 48, that is, the maximum value of the l is limited to the distance between the tip of the vibrating portion 48 when the pad 24 is at the most retreated status and the rear edge of the anti-rattling spring 56. On the contrary, the projection 140 is disposed on the side of the anti-rattling spring 56 which does not change its position throughout the whole wearing course of the friction pad 16, so the length from the projection 140 to the tip of the vibrating portion 142 grows larger according to the wear of the friction pad 16. And the final length thereof, i.e., l is given as the distance between the tip at a status where the pad 24 has been pushed forward maximum and the position fixed projection 140. And the projection 140 is, even when it is disposed on the rear edge of the anti-rattling spring 56, always so contacted with the side surface of the vibrating portion 142 as not to hinder smooth movement of the vibrating portion 142, so the l can be selected longer than that shown in FIG. 4 with the maximum length which is the distance between the tip of the vibrating portion 142 when the pad 24 had been pushed forward to the greatest extent and the rear edge of the anti-rattling spring 56. The length is furthermore changeable in a comparatively wide range. It makes it easy to produce a most suitable warning sound considering various related conditions such as other noises which are changed due to variety of vehicle types and others, which enhances effect of the warning higher. FIGS. 17 and 18 respectively show an example wherein the projection 150(152) is disposed on the front (rear) side than the position illustrated in FIG. 15, i.e., almost at the middle of the torque member 27 in the direction of thickness thereof. In those instances the warning sound may be higher (or lower) than that in the device shown in FIG. 15.

Figure 19:
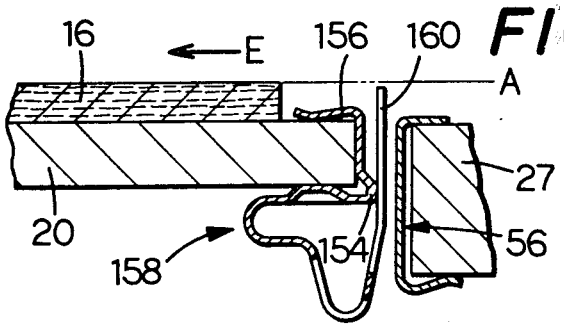
FIG. 19 is a plan sectional view of a further embodiment of this invention.

FIG. 19 shows still another embodiment of this invention, wherein a projection 154 is disposed on a fixing portion 156 of a vibration spring 158. The rotational direction of the rotor 10 in this embodiment is that shown with an arrow E. When the spring 158 attached on the backing plate 20 is inserted into the torque member 27, the insertion or assemblying thereof in this instance is easy and advantageous because of the undivergent or unexpanded posture of a vibrating portion 160. This embodiment is suitable when the length from the projection 154 to the tip of the vibrating portion 160 is attempted to be reduced.

Incidentally the vibration springs are considered to be mounted in all of the above embodiments on the lugs both the inner pad and the outer pad, but it is permissible to dispose the same only on the lug of a heavily wearing one of the pads.

They may of course be attached on the lugs on opposite sides of one pad.

As to the rotating direction of the disc rotor when the vibrating portion is contacted therewith, it may be agreeable with the direction in which the projection formed on the vibrating portion is departed from the supporting member resisting the biasing force of the spring portion (reversed direction to those in the previous embodiments). In this case the vibrating portion is excited not only by the stick slip phenomenon caused by the disc rotor but also by the repeated occurring impact of the projection against the supporting member. The warning to the driver by the high frequency alarming sound accompanied by the repeated striking or knocking sound becomes easier to recognize.

The anti-rattling spring which is secured to the backing plate may be integrally formed with the vibrating spring.

It will be understood by those skilled in the art that the foregoing description is concerned only to some embodiments of the present invention and that various changes and modifications may be made without departing from the scope of the appended claims.

What is claimed is:

1. A device for warning of the allowable wear-limit of a pad assembly in a disc brake, in which said pad assembly includes a friction pad and a backing plate firmly attached to a backside of said friction pad and the backing plate is retained by a torque member for being urged into contact with a friction surface of a disc rotor so as to restrain rotation of said disc rotor, said device producing an alarming sound when said friction pad has been worn to a maximum allowable limit, said device comprising:

a vibration member including, a fixing portion secured to a lateral end portion of said backing plate, a spring portion formed into a curve as an extension from said fixing portion and located adjacent a rearside of said pad assembly, and a vibrating portion extending from said spring portion while passing through a gap formed between a lateral end portion of said backing plate and said torque member and extending towards the friction surface of said disc rotor such that an end of said vibrating portion is substantially located at a limiting position for wear of said friction pad, said spring portion biasing said vibrating portion in a direction corresponding to the rotating direction of said disc rotor;

a supporting member supporting said vibrating portion at a root portion thereof against the biasing force of said spring portion; and a projection disposed on one of said supporting member and said vibrating portion, said projection being located within said gap and defining the sole contact area between the vibrating portion and said supporting member for spacing said vibrating portion from said supporting member within said gap, said vibrating portion being biased by said spring portion to maintain contact between said projection and said one of said supporting member and said vibrating portion at said sole contact area.

2. A wear-limit warning device claimed in claim 1, wherein said projection is formed on said vibrating portion.

3. A wear-limit warning device claimed in claim 1, wherein said supporting member is a member fixed on the lateral end portion of said backing plate.

4. A wear-limit warning device claimed in claim 3, wherein said member fixed on the lateral end portion of said backing plate is a fixing portion of said vibration member.

5. A wear-limit warning device claimed in claim 1, wherein said supporting member is a lug formed on the lateral end portion of said backing plate.

6. A wear-limit warning device claimed in claim 1, wherein said supporting member is a member fixed on said torque member.

7. A wear-limit warning device claimed in claim 6, wherein said member fixed on said torque member is an anti-rattling spring for preventing said pad assembly from rattling.

8. A wear-limit warning device claimed in claim 1, wherein said vibration member is bifurcated in the neighborhood of said projection to be a pair of said vibrating portions.

9. A wear-limit warning device claimed in claim 1, wherein said fixing portion is of substantially angular U-shape to embrace the lateral end portion of said backing plate.

10. A wear-limit warning device claimed in claim 1, wherein said spring portion consists of a first bent portion having arms forming a U-shape opened in a direction perpendicular to a longitudinal direction of said vibrating portion and a second bent portion having arms forming a U-shape opened in a direction parallel to the longitudinal direction of said vibrating portion, one arm of said second bent portion being connected to an arm of said first bent portion and the other arm of said second bent portion connected to said vibrating portion.

11. A wear-limit warning device claimed in claim 1, wherein said backing plate is provided with a lug on a lateral end portion thereof to be slidably engaged with a guide groove formed in said torque member and an attaching groove is formed on an end surface of said lug along a direction of thickness of said backing plate, said fixing portion being fixed on said lug within said groove in a direction of the width of said groove to prevent movement of said fixing portion.

12. In a disc brake having a pad assembly which includes a friction pad firmly attached to a backing plate which is retained by a torque member and urged into frictional contact with the surface of a disc rotor to restrain rotation of the disc rotor, and a warning device for producing an alarming sound when said friction pad has been worn to a maximum allowable limit, the improvement in said disc brake and warning device comprising:

said backing plate including a lateral end, said lateral end of said backing plate and said torque member being constructed and arranged to define a gap therebetween and maintain said gap during movement of said pad assembly into frictional contact with said disc rotor; and said warning device comprising, a vibration member including, a fixing portion secured to a lateral end portion of said backing plate, a spring portion formed into a curve as an extension from said fixing portion and located adjacent a rearside of said pad assembly, and a vibrating portion extending from said spring portion while passing through said gap and extending towards the friction surface of said disc rotor such that an end of said vibrating portion is substantially located at a position of a wear-limit of said friction pad, said spring portion biasing said vibrating portion in a direction corresponding to the rotating direction of said disc rotor;

a supporting member supporting said vibrating portion at a root portion thereof against the biasing force of said spring portion; and a projection disposed on one of said supporting member and said vibration portion, said projection being located within said gap and defining the sole contact area between the vibrating portion and said supporting member for spacing said vibrating portion from said supporting member within said gap, said vibrating portion being biased by said spring portion to maintain contact between said projection and said one of said supporting member and said vibrating portion at said sole contact area.

13. A wear-limit vibrating spring assembly for providing an alarm sound when a friction pad of a disc brake has been worn to an allowable limit, said assembly comprising:

a fixing portion;

a spring portion coupled to said fixing portion;

a vibrating portion coupled to said spring portion; and a supporting member located adjacent said vibrating portion, said fixing portion allowing mounting of said vibrating spring assembly such that an end of said vibrating portion moves into contact with a rotating disc when a friction pad has been worn to an allowable limit, one of said vibrating portion and said supporting member having a projection which spaces said vibrating portion from said supporting member and defines the sole contact area between said vibrating portion and said supporting member, said spring portion biasing said vibrating portion in a direction of rotation of a disc to maintain said sole contact area between said vibrating portion and said supporting member.

14. The vibrating spring assembly of claim 13 wherein said projection is formed on said vibrating portion.

15. The vibrating spring assembly of claim 13 wherein said projection is formed on said supporting member.

16. The vibrating spring assembly of claim 13 wherein said projection is formed on said vibrating portion and said fixing portion forms said supporting member.

* * * * *